United States Patent Office 3,235,057
Patented Feb. 15, 1966

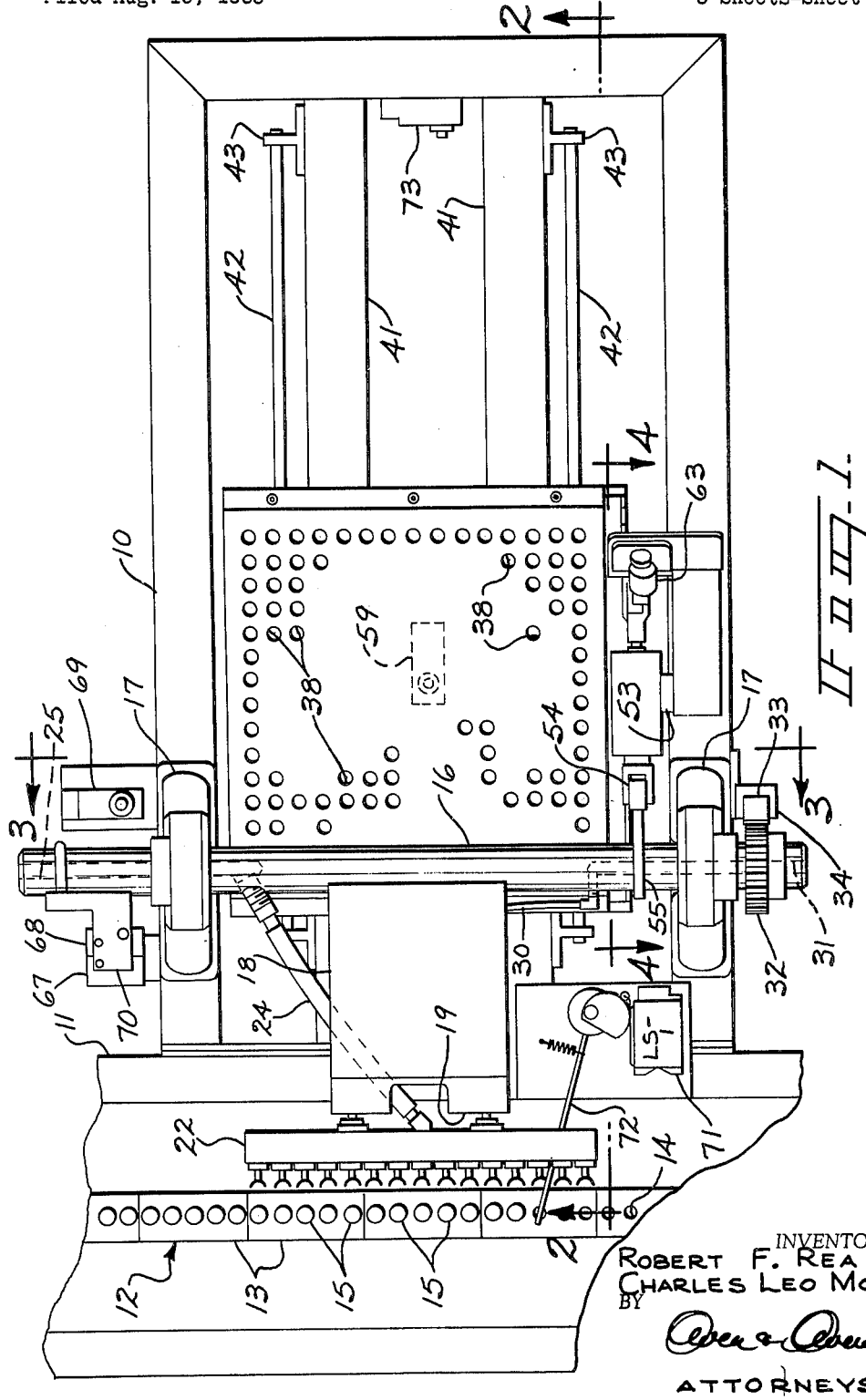

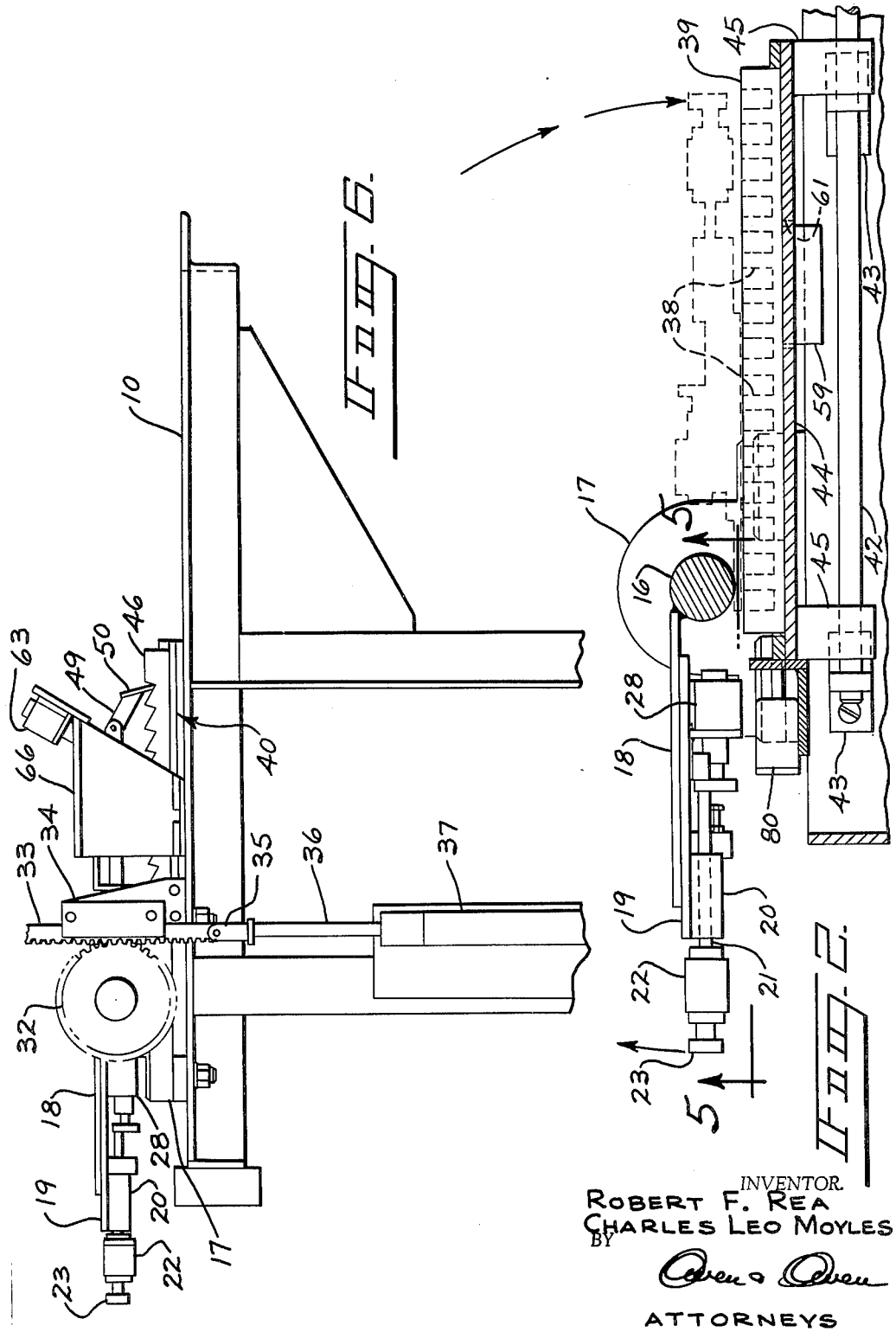

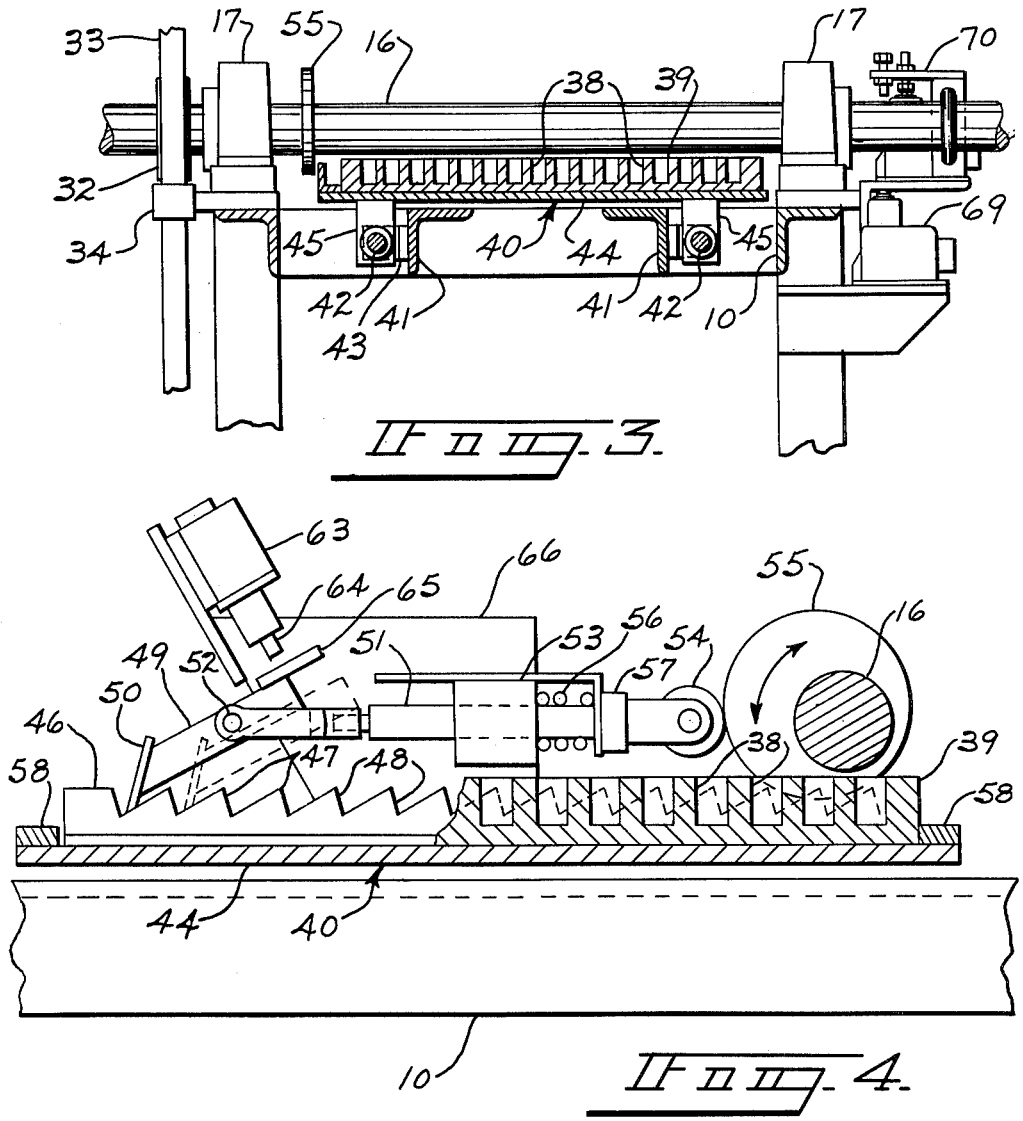

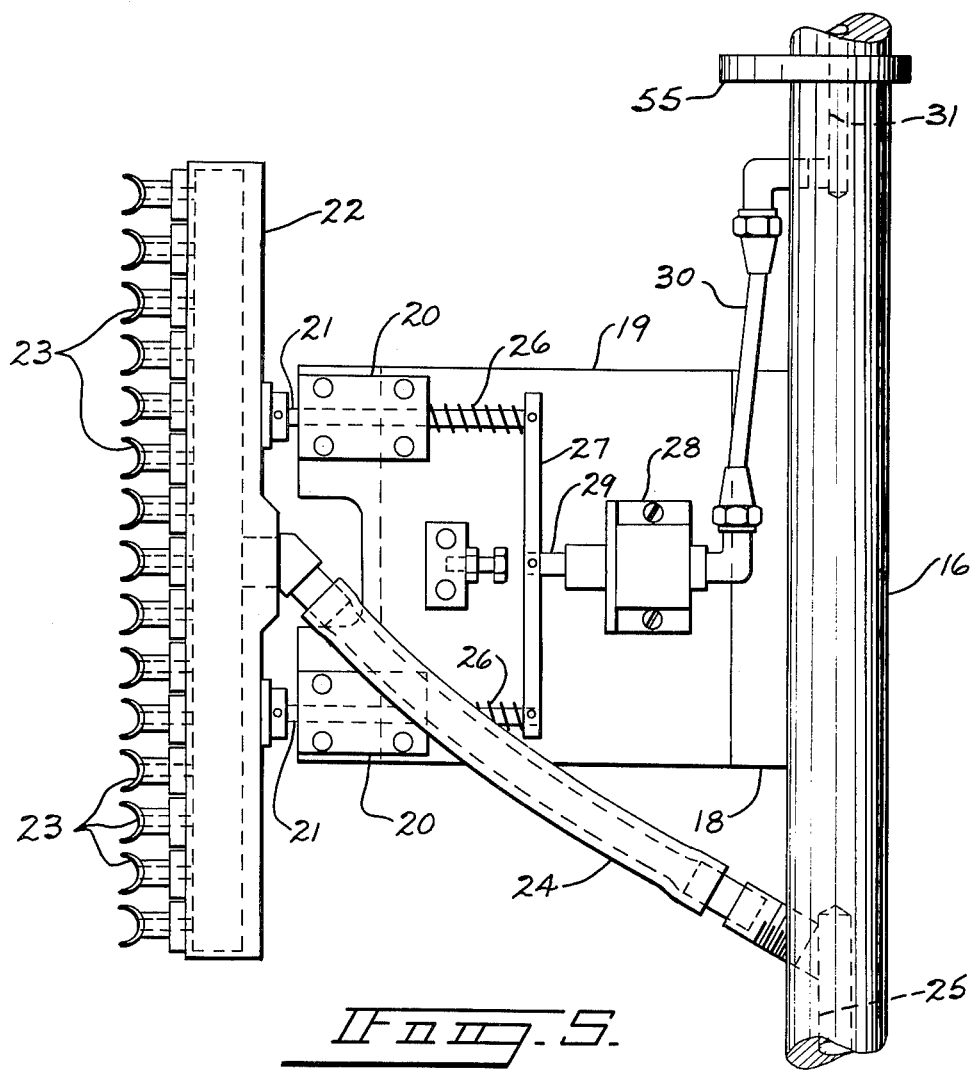

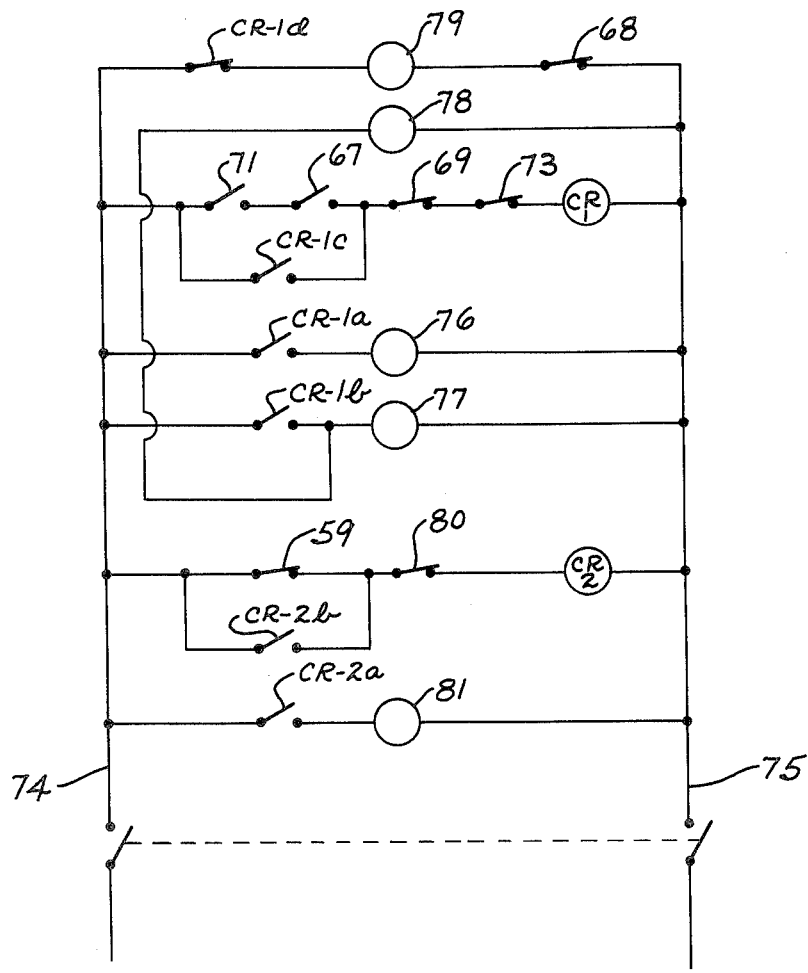

3,235,057
CONVEYOR UNLOADER
Robert F. Rea, Bloomfield Hills, and Charles Leo Moyles, Royal Oak, Mich., assignors to Champion Spark Plug Company, a corporation of Delaware
Filed Aug. 15, 1963, Ser. No. 302,321
5 Claims. (Cl. 198—20)

The present invention relates to machines for transferring work pieces from one position to another, and more particularly to a machine for removing work pieces from a moving conveyor.

An object of the present invention is the provision of a new and improved work unloading device which lifts work pieces out of holders that are carried by a moving conveyor.

A further object of the invention is the provision of a new and improved device of the above mentioned type which loads the work pieces in a row on trays.

The invention resides in certain constructions and combinations and arrangements of parts; and further objects and advantages will become apparent to those skilled in the art to which the invention relates from the following description of a preferred embodiment described with reference to the accompanying drawings forming a part of this specification, and in which:

FIG. 1 is a plan view of an embodiment of the present invention;

FIG. 2 is a cross sectional view taken approximately on the line 2—2 of FIG. 1;

FIG. 3 is a cross sectional view taken approximately on the line 3—3 of FIG. 1;

FIG. 4 is a cross sectional view taken approximately on the line 4—4 of FIG. 1;

FIG. 5 is a view taken approximately on the line 5—5 of FIG. 2 showing the bottom side of the work transfer arm;

FIG. 6 is a view looking at the front side of the machine as seen in FIG. 1; and FIG. 7 is a wiring diagram of the controls for the machine.

The machine shown in the drawing comprises a frame 10 which extends to one side of the frame 10 of a conveyor 12. The conveyor 12 has a plurality of work holders 13 thereon which contain aligned openings 14 from which generally cylindrically shaped work pieces 15 project.

The work pieces have small shoulders thereon which sit on top of the holders 13 and support the work pieces in an upright position.

The machine shown in the drawings includes a transverse shaft 16 which extends parallel to the conveyor 12 and which is journaled to the top of the frame 10 by means of a pair of pillow blocks 17 positioned on opposite sides of the frame 10. A rectangular plate forming an arm 18 is welded to the shaft 16, and a second plate 19 is fixed to the bottom of the arm 18 to act as a support for structure later to be described. A pair of guides 20 (see FIG. 5) are fixed to the bottom radially outer end of the plate 19, and a pair of pins 21 project radially outwardly of the guides 20 for movement toward and away from the shaft 16. The outer ends of the pins 21 are fixed to a vacuum manifold 22 which extends across the arm 18 parallel to the shaft 16. The vacuum manifold is provided with 15 nipples not shown which project radially outwardly from the manifold at the exact spacing of the openings 14 of the conveyor work holders, and a rubber suction cup 23 is mounted on each of nipples. Vacuum is communicated to the manifold 22 through a flexible hose 24 which communicates with a drilling 25 in the shaft 16. The drilling 25 communicates with the back end of the shaft 16 as seen in FIG. 1 where it is connected to a flexible vacuum line not shown.

The slide pins 21 project radially inwardly of the guides 20, and the vacuum manifold is normally held in its radially inner position adjacent the guides 20 by means of a pair of coil springs 26 which are positioned around the inner ends of the pins 21 between the guides 20 and a cross bar 27 which connects the two pins 21. The vacuum manifold is adapted to be extended outwardly of the arm 18 to bring the suction cups 23 into engagement with work pieces in the conveyor by means of a single acting air cylinder 28 which is fastened to the plate 19 and whose piston rod 29 is connected to the cross bar 27. Air pressure is supplied to the air cylinder 28 by means of an air line 30 which communicates with an end drilling 31 in the near end of the shaft 16. A flexible hose (not shown) communicates the drilling 31 with an air supply line (not shown).

The arm 18 is adapted to be swung 180° from a position adjacent the conveyor 12 shown in solid lines in FIG. 2 to the unloading position shown by the dotted lines in FIG. 2. The swinging of the arm 18 is accomplished by means of a pinion gear 32 fixed to the front end of the shaft 16, and a meshing rack 33. The rack is held in engagement with the pinion gear 32 by means of a guide 34 (see FIG. 6), and the bottom end of the rack 33 is pinned to a bifurcated yoke 35 that in turn is affixed to the top end of a piston rod 36 of an air cylinder 37. The transfer arm 18 is caused to be adjacent the conveyor when air pressure is admitted to the bottom of the air cylinder 37, and the arm is swung to the unloading position shown by dotted lines in FIG. 2 by admitting air pressure to the top of the air cylinder 37.

The machine shown in the drawings is adapted to place the work pieces in openings 38 in a tray 39. The tray 39 has a plurality of rows of openings 38, which rows are uniformly spaced apart radially of the shaft 16. The tray 39 is placed in the machine so that its radially outermost row of openings 38 is at the work releasing position of the arm 18, and means are provided for shifting the tray radially outwardly by a distance corresponding to the spacing of the rows during the return of the arm to its position adjacent the conveyor 12. The tray 39 is placed on top of a platform 40 (see FIG. 3) which is supported for movement toward and away from the shaft 16.

The frame 10 of the machine includes two angle iron members 41 which extend at right angles to the shaft 16 beneath the platform 40. Respective ones of a pair of rods 42 are secured to respective ones of said angle iron members 41 by means of T-bar brackets 43. The platform 40 comprises a plate 44 having two pair of guide blocks 45 depending from its bottom side. The guide blocks 45 have openings therethrough which receive the rods 42—one rod 42 passing through one pair of blocks 45 and the other rod 42 passing through the other pair of blocks 45.

The platform 40 is adapted to be slid outwardly by a distance corresponding to the spacing between the rows of openings 38 each time that the arm 18 returns from its unloading position over the tray 39 to its loading position adjacent the conveyor 12. This is accomplished by means of a ratchet and pawl arrangement, best seen in FIG. 4. An angle iron 46 having ratchet teeth 47 is fastened to the near side of the platform 40 as seen in FIG. 1. The ratchet teeth 47 have generally vertical surfaces 48 facing the shaft 16 and spaced apart a distance equal to the spacing of the rows of openings 38. A pawl 49 having a flat pushing face 50 is positioned for abutment with the vertical surfaces 48 of the ratchet teeth 47. The pawl 49 is pivotally mounted on a pusher arm 51 as by a pin 52, and the pusher arm is slidably received in a guide 53 for movement toward and away from the shaft 16 parallel to the guide rods 42. The end of the pusher arm 51 adjacent the shaft 16 is provided with a roller or cam follower 54 which is biased against a cam 55 by means of a coil spring 56 positioned between the guide block 53 on the front side of the machine and a bifurcated fitting 57 which attaches the roller 54 to the pusher arm 51. The cam 55 is so constructed as to push the roller 54 outwardly away from the shaft 16 as the arm 18 swings from a position over the tray to a position adjacent the conveyor 12. During the swinging movement of the arm 18 from the conveyor to a position over the tray 39, the pusher arm 51 is retracted by the coil spring 56 and the pawl 49 pivots about the pin 52 and rides up over the high point of a ratchet tooth 47 to the next valley. The tray 39 is accurately located on the platform 40 by means of stops 58.

After the platform 40 has been advanced all of the way out from the shaft 16 and a tray 39 thereon is filled with work pieces, the tray is removed by an operator of the machine. A normally closed limit switch 59 (see FIG. 2) having a contact button, not shown, is positioned in an opening 61 in the plate 44 for abutment by a tray 39. When a tray is removed, the switch 59 is closed to actuate an air valve, not shown, which supplies air pressure to an air cylinder (see FIG. 4). The air cylinder 63 is supported so that its plunger 64 abuts a contact plate 65 positioned on the other side of the pin 52 from the abutment face 50 of the pawl. This holds the pawl in an upper position which permits an unfilled tray to be inserted on the platform 40. When the tray 39 is in position on the platform 40 and the tray is pushed to its inner position it opens the switches 59 and 80 and deactivates the air cylinder 63 to permit the pawl 49 to swing down into operative engagement with the ratchet teeth 47. The guide 53 and air cylinder 63 are supported on a bracket 66 that is affixed to the frame 10.

Swinging movement of the transfer arm 18 is controlled by normally open limit switches 67 and 68 (see FIG. 1) which are positioned on the conveyor side of the transverse shaft 16, as well as by a normally closed limit switch 69 positioned on the opposite side of the transverse shaft 16 in line with limit switches 67 and 68. An arm 70 is connected to the transverse shaft 16 in a position generally parallel to the transfer arm 18, and limit switches 67 and 68 are closed when the arm 70 is in its horizontal position adjacent the conveyor, and limit switch 69 is opened when the arm 70 is in its horizontal position over the ware tray 39.

A limit switch 71 is positioned so that its contact arm 72 is tripped when a work piece proceeds to the end of the conveyor 12 adjacent the last rubber suction cup 23 of the vacuum manifold 22. Operation of the device is controlled by still another normally closed limit switch 73 which is mounted on the right hand end of the frame 10 and is adapted to be contacted by the platform 40 and opened when the tray 39 has been advanced to where its last row of holes is located at the unloading position for the transfer arm 18.

Operation of the device will now be described with reference to the wiring diagram of FIG. 7. Limit switches 71, 67, 69 and 73 are connected together in series with control relay CR1 between the electrical supply lines 74 and 75. When the transfer arm 18 is in its horizontal position adjacent the conveyor 12, the limit switches 69 and 73 are in their normally closed position and limit switch 67 is closed by the arm 70. When a work piece enters a position opposite the last rubber suction cup 23 on the vacuum manifold 22, the limit switch 71 is closed to complete a circuit from wire 74 through limit switches 67, 69, 73 and control relay CR–1 to the electrical wire 75. Actuation of control relay CR–1 closes its contacts CR–1a in series circuit with a vacuum solenoid valve 76 between wires 74 and 75 to communicate vacuum to the drilling 25 and the vacuum manifold 22. At the same time normally open contacts CR–1b and CR–1c are closed and normally closed contact CR–1d is opened. Closing of contact CR–1b establishes a circit from wire 74 through solenoid valve 77 to wire 75. This causes solenoid valve 77 to supply air pressure to the air cylinder 28 to move the vacuum suction cups 23 against work pieces in the conveyor. Closing of contact CR–1b also establishes a circuit through a solenoid valve 78 to wire 75 which supplies air pressure to the top of air cylinder 37 (see FIG. 6) to swing the transfer arm 18 to a position over the ware board 39. Movement of arm 18 out of its loading position adjacent the conveyor opens limit switches 71 and 67, but the control relay CR–1 is held energized by a holding circuit comprising contacts CR–1c which is in parallel circuit with the limit switches 71 and 67.

When the transfer arm reaches its unloading position over the ware board 39, arm 70 opens limit switch 69 to drop out the control relay CR–1. Deenergization of control relay CR–1 opens contacts CR–1a and CR–1b to deenergize the vacuum valve 76, the solenoid air valve 77, and the solenoid air valve 78. Deenergization of vacuum valve 76 shuts off vacuum to the suction cups 23; deenergization of solenoid air valve 77 shuts off air to the air cylinder 28 to retract the suction cups 23; and deenergization of the air valve 78 shuts off air to the top side of the air cylinder 37. Deenergization of control relay CR–1 also closes contact CR–1d to establish a circuit from wire 74 through solenoid air valve 79 and limit switch 68 to wire 75 to actuate solenoid air valve 79. Actuation of solenoid air valve 79 communicates air pressure to the bottom of air cylinder 37 to swing the transfer arm 18 back to its horizontal starting position adjacent the conveyor 12. When the transfer arm reaches its starting position, arm 70 opens limit switch 68 to remove air pressure from the bottom of air cylinder 37.

During movement of the transfer arm 18 from its loading position to its unloading position over the ware tray 39, the cam 55 was rotated clockwise as seen in FIG. 4 to allow spring 56 to move the pusher arm 51 toward the transfer shaft 16, and the pawl 49 to ride up over one ratchet tooth 47. During the return stroke of the transfer arm 18 from its unloading position to its starting position, the cam 55 pushes the pusher arm 51 outwardly from the dotted position to the solid position shown in FIG. 4 to advance the tray 39 outwardly to bring the next vacant row of holes 38 in line with the unloading position of the transfer arm 18. When the ware tray 39 has been filled, and it is advanced outwardly the distance of one ratchet tooth 47 further, the limit switch 73 is opened so that control relay CR–1 can no longer be energized, and the transfer arm 18 is prevented from removing further work pieces from the conveyor 12. Alternatively, the limit switch 73 can be omitted from the series circuit with relay CR–1, and can be made a normally open switch which is closed when the ware tray 39 is completely filled to actuate an alarm.

After a ware tray 39 is full, an operator must remove the loaded tray and must place an empty tray in its place on the platform 40. When a tray 39 is in position in the machine, it opens the normally closed limit switch 59 (see FIG. 2) which abuts the bottom of the tray 39. Another normally closed limit switch 80 is mounted on the frame 10 adjacent the conveyor end of the platform 40, and the limit switch 80 is opened when the platform is so positioned as to bring the first row of openings 38 in the unloading position of the unloading arm 18. Limit switches 59 and 80 are in series circuit with a control relay CR–2 between the wires 74 and 75. When a full tray is lifted from the platform 40, limit switch 59 is closed to energize control relay CR–2. Energization of control relay CR–2 closes its normally open contacts CR–2a and CR–2b. Contacts CR–2a establishes an electrical circuit between wires 74 and 75 through solenoid air valve 81 which when actuated admits air pressure to air cylinder 63 to lift pawl 49 from the ratchet teeth 47. Contacts CR–2b provide a holding circuit around the limit switch 59 so that an empty tray can be placed upon platform 40 without deactivating control relay CR–2. When the platform 40 with an empty tray is forced to its farthest most position toward the conveyor, it opens limit switch 80 to deactivate control relay CR–2 and solenoid valve 81 to allow the spring loaded air cylinder 63 to retract its piston 64 and thereby allow the pawl 49 to drop into contact with the ratchet teeth 47. Thereafter the ware tray 39 will be advanced by the pusher arm 51 each time that the transfer arm 18 returns to its starting position.

While the invention has been described in considerable detail, we do not wish to be limited to the particular embodiment shown and described, and it is our intention to cover hereby all novel adaptations, modifications and arrangements thereof which come within the practice of those skilled in the art to which the invention relates.

What we claim is:

1. In an unloading device for transferring objects between parallel horizontal loading and unloading stations: a generally horizontal shaft positioned parallel to and between said loading and unloading stations, an arm attached to said shaft and extending generally normal thereto, means for rotating said shaft 180° to swing said arm from one horizontal position adjacent the loading station to another horizontal position adjacent the unloading station, an object holding head on said arm having means which when actuated pulls and holds an object onto said head and which when deactuated releases the object, said head facing generally radially outwardly of said shaft, means sensing an object in said loading station and actuating said holding head to attract and hold the object onto said head, means causing said shaft to thereafter rotate 180° to swing the object to the unloading station, means deactuating said holding head to drop the object at the unloading station, means causing said first mentioned means to swing said arm back to its horizontal position adjacent the loading station, a carriage at said unloading station, said carriage being movable away from said horizontal shaft, a ratchet operatively connected to said carriage, a cam on said horizontal shaft, and means including a cam follower engaging said cam and a pawl engaging said ratchet and operable to index said carriage during rotation of said shaft.

2. In an unloading device for transferring objects between parallel horizontal loading and unloading stations: a generally horizontal shaft positioned parallel to and between said loading and unloading stations, an arm attached to said shaft and extending generally normal thereto, means for rotating said shaft 180° to swing said arm from one horizontal position adjacent the loading station to another horizontal position adjacent the unloading station, an object holding head on said arm having means which when actuated pulls and holds an object onto said head and which when deactuated releases the object, said head facing generally radially outwardly of said shaft, extensible means connecting said head to said arm for moving said head between radially inner and radially outer positions relative to said shaft, means sensing an object in said loading station and actuating said extensible means and holding head to move said head up into engagement with an object in said loading station and to attract and hold the object onto said head, means causing said shaft to thereafter rotate 180° to swing the object to the unloading station, means deactuating said holding head to drop the object at the unloading station, and means deactuating said extensible means and causing said first mentioned means to swing said arm back to its horizontal position adjacent the loading station.

3. In an unloading device for transferring objects between parallel horizontal loading and unloading stations: a generally horizontal shaft positioned parallel to and between said loading and unloading stations, an arm attached to said shaft and extending generally normal thereto, means for rotating said shaft 180° to swing said arm from one horizontal position adjacent the loading station to another horizontal position adjacent the unloading station, an object holding head on said arm having means which when actuated pulls and holds an object onto said head and which when deactuated releases the object, said head facing generally radially outwardly of said shaft, extensible means connecting said head to said arm for moving said head between radially inner and radially outer positions relative to said shaft, means sensing an object in said loading station and actuating said extensible means and holding head to move said head up into engagement with an object in said loading station and to attract and hold the object onto said head, means causing said shaft to thereafter rotate 180° to swing the object to the unloading station, a board at said unloading station having equally spaced apart openings arranged radially from said unloading station toward said shaft, means deactuating said holding head to drop the object into an opening at the unloading station, means deactuating said extensible means and causing said first mentioned means to swing said arm back to its horizontal position adjacent the loading station, and means for advancing said board radially outwardly to bring the next hole in said board in line with the unloading station as said arm swings back to its horizontal position adjacent the loading station.

4. In an unloading device for transferring objects between parallel horizontal loading and unloading stations: a generally horizontal shaft positioned parallel to and between said loading and unloading stations, an arm attached to said shaft and extending generally normal thereto, means for rotating said shaft 180° to swing said arm from one horizontal position adjacent the loading station to another horizontal position adjacent the unloading station, a suction cup on said arm, said suction cup facing radially outwardly of said shaft, extensible means connecting said suction cup to said arm for moving said suction cup between radially inner and radially outer positions relative to said shaft, a vacuum valve for supplying vacuum to said suction cup when said valve is opened and shutting off vacuum to said suction cup when said valve is closed, means sensing an object in said loading station and actuating said extensible means and vacuum valve to move said suction cup up into engagement with an object in said loading station and opening vacuum communication to said suction cup to hold the object onto said suction cup, means causing said shaft to thereafter rotate 180° to swing the object to the unloading station, means deactuating said vacuum valve to drop the object at the unloading station, and means deactuating said extensible means and causing said first mentioned means to swing said arm back to its horizontal position adjacent the loading station.

5. In an unloading device for transferring objects between parallel horizontal loading and unloading stations: a generally horizontal shaft positioned parallel to and between said loading and unloading stations, an arm attached to said shaft and extending generally normal thereto, means for rotating said shaft 180° to swing said arm from one horizontal position adjacent the loading station to another horizontal position adjacent the unloading station, a suction cup on said arm, said suction cup facing radially outwardly of said shaft, extensible means connecting said suction cup to said arm for moving said suction cup between radially inner and radially outer positions relative to said shaft, a vacuum valve for supplying vacuum to said suction cup when said valve is opened and shutting off vacuum to said suction cup when said valve is closed, means sensing an object in said loading station and actuating said extensible means and vacuum valve to move said suction cup up into engagement with an object in said loading station and opening vacuum communication to said suction cup to hold the object onto said suction cup, means causing said shaft to thereafter rotate 180° to swing the object to the unloading station, a board at said unloading station having equally spaced apart openings arranged radially from said unloading station toward said shaft, means deactuating said vacuum valve to drop the object into the opening at the unloading station, means deactuating said extensible means and causing said first mentioned means to swing said arm back to its horizontal position adjacent the loading station, and ratchet and cam means for advancing said board radially outwardly to bring the next hole in said board in line with the unloading station as said arm swings back to its position adjacent the loading station.

References Cited by the Examiner
UNITED STATES PATENTS

| | | |
|---|---|---|
| 1,801,309 | 4/1931 | Gipe. |
| 2,623,626 | 12/1952 | Ditolla _____ 198—21 |
| 2,925,183 | 2/1960 | Eastus. |
| 3,025,978 | 3/1962 | Hill. |

SAMUEL F. COLEMAN, *Primary Examiner.*